US011597195B2

(12) United States Patent
Nakamura

(10) Patent No.: US 11,597,195 B2
(45) Date of Patent: Mar. 7, 2023

(54) MANUFACTURING METHOD AND MANUFACTURING APPARATUS FOR LAMINATE

(71) Applicant: ZUIKO CORPORATION, Osaka (JP)

(72) Inventor: Hideyuki Nakamura, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 0 days.

(21) Appl. No.: 17/282,760

(22) PCT Filed: Oct. 28, 2019

(86) PCT No.: PCT/JP2019/042209
§ 371 (c)(1),
(2) Date: Apr. 4, 2021

(87) PCT Pub. No.: WO2020/090753
PCT Pub. Date: May 7, 2020

(65) Prior Publication Data
US 2022/0001659 A1 Jan. 6, 2022

(30) Foreign Application Priority Data
Oct. 29, 2018 (JP) .............................. JP2018-202621

(51) Int. Cl.
B32B 37/15 (2006.01)
B29C 48/88 (2019.01)
(Continued)

(52) U.S. Cl.
CPC ........ *B32B 37/153* (2013.01); *B29C 48/0018* (2019.02); *B29C 48/0021* (2019.02);
(Continued)

(58) Field of Classification Search
None
See application file for complete search history.

(56) References Cited

U.S. PATENT DOCUMENTS 6,238,767 B1  5/2001  McCormack
8,578,996 B2  11/2013  Lee
(Continued)

FOREIGN PATENT DOCUMENTS

IT  1141790 B  * 10/1986  ........... B32B 37/153
JP  H09-267456 A  10/1997
(Continued)

OTHER PUBLICATIONS

International Search Report for corresponding Application No. PCT/JP2019/042209, dated Dec. 10, 2019.

*Primary Examiner* — Barbara J Musser
(74) *Attorney, Agent, or Firm* — Renner, Otto, Boisselle & Sklar, LLP

(57) ABSTRACT

A manufacturing method including a first conveying step of conveying the sheet in a lateral or oblique lateral direction along a sheet pass line below the discharge port; a receiving step of receiving a tip part of the film raw material with the sheet on the sheet pass line, the tip part being discharged and hanging down from the discharge port; a second conveying step of conveying the sheet and the film raw material after the tip part overlaps the sheet on the sheet pass line, the second conveying step conveying the sheet and the film raw material in a mutually overlapping state along the sheet pass line; and an introducing step of introducing the sheet and the film raw material in the mutually overlapping state to the joining part from the sheet pass line.

14 Claims, 3 Drawing Sheets

(51) Int. Cl.
    *B29C 48/08*     (2019.01)
    *B29C 48/00*     (2019.01)
    *B32B 5/02*     (2006.01)
    *B32B 25/10*     (2006.01)
    *B32B 38/00*     (2006.01)
    *B29K 21/00*     (2006.01)
    *B29L 7/00*     (2006.01)
    *B29L 9/00*     (2006.01)

(52) U.S. Cl.
    CPC ............ *B29C 48/08* (2019.02); *B29C 48/914* (2019.02); *B32B 5/022* (2013.01); *B32B 25/10* (2013.01); *B32B 38/0012* (2013.01); *B29K 2021/003* (2013.01); *B29L 2007/008* (2013.01); *B29L 2009/00* (2013.01); *B32B 2038/0028* (2013.01)

(56) References Cited

U.S. PATENT DOCUMENTS

| | | | |
|---|---|---|---|
| 9,457,547 B2 | 10/2016 | Ogden, Jr. | |
| 2010/0168704 A1* | 7/2010 | Thomas | B32B 27/20 |
| | | | 604/366 |
| 2014/0024513 A1 | 1/2014 | Robert | |
| 2015/0299947 A1* | 10/2015 | Brumbelow | D06N 7/0076 |
| | | | 428/95 |

FOREIGN PATENT DOCUMENTS

| | | |
|---|---|---|
| JP | H10-29259 A | 2/1998 |
| JP | 2001 032160 A | 2/2001 |

\* cited by examiner

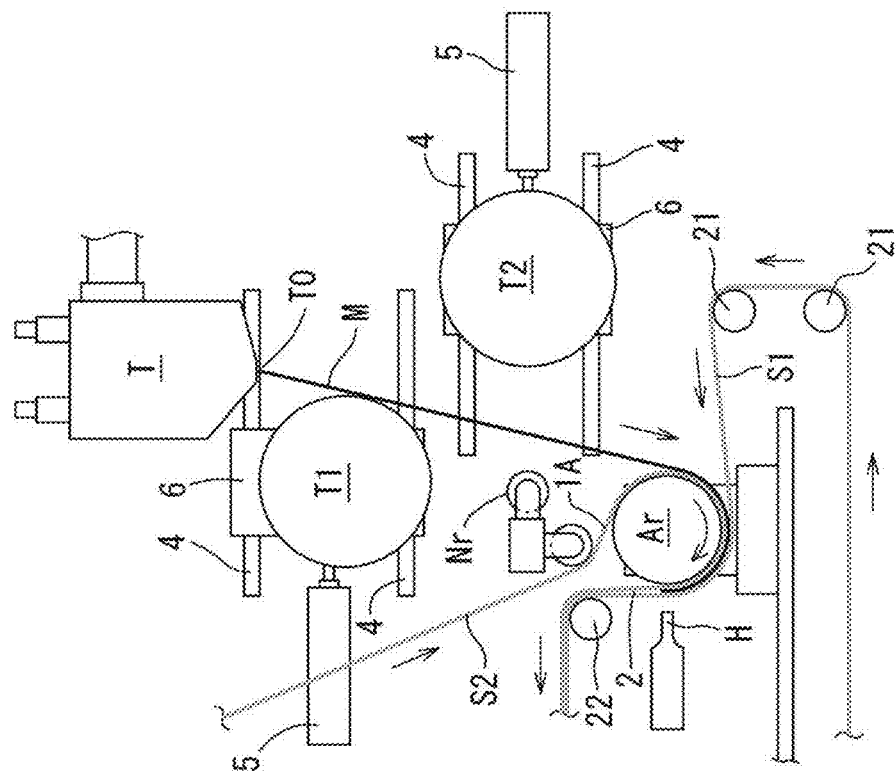
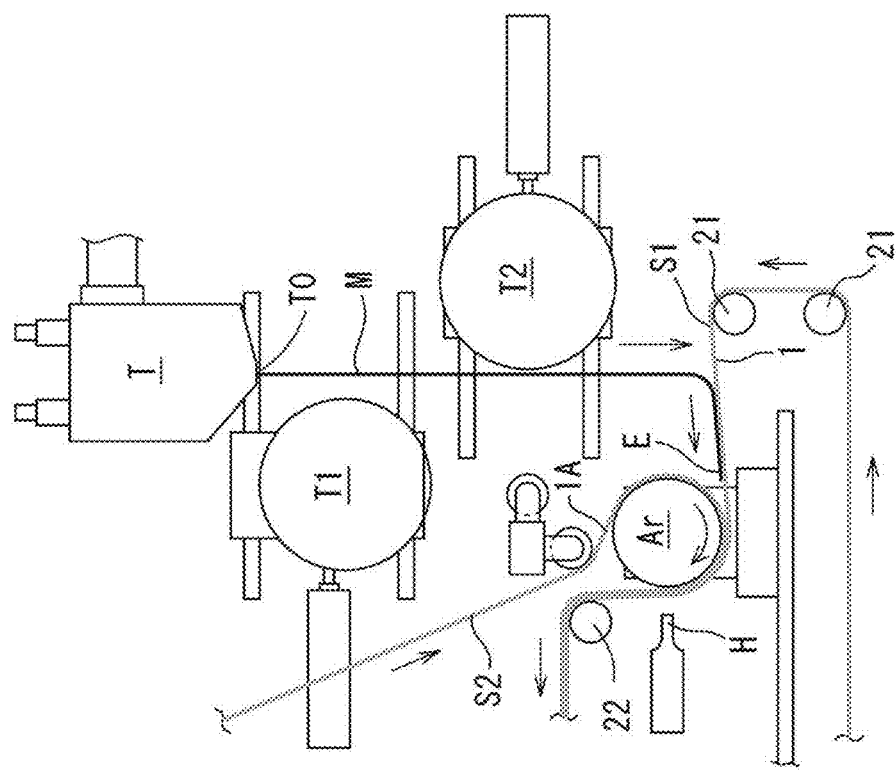

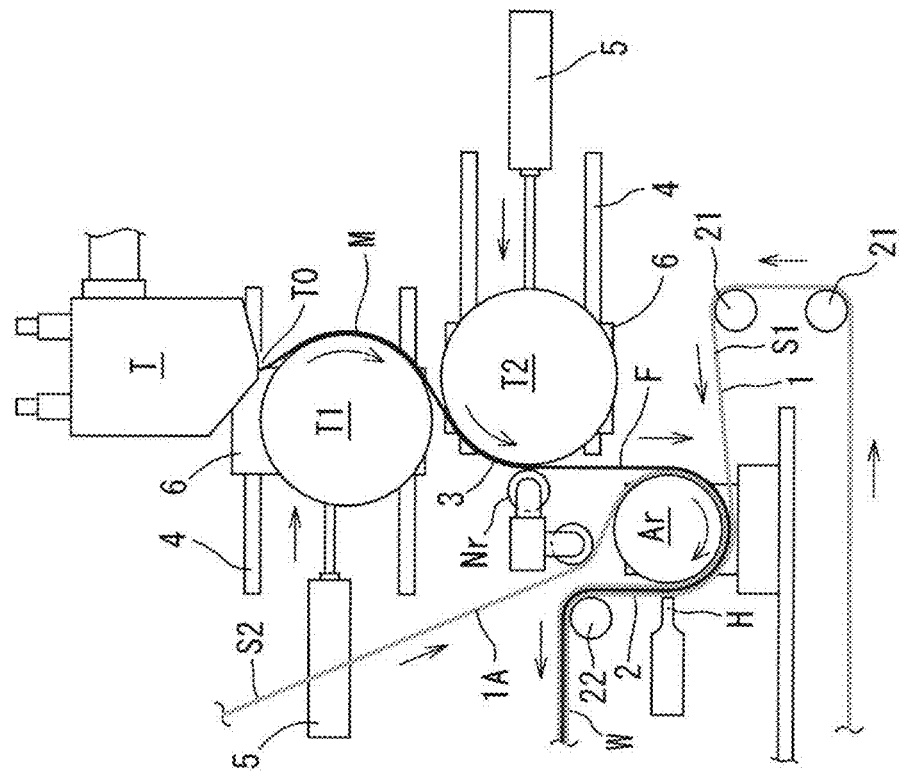
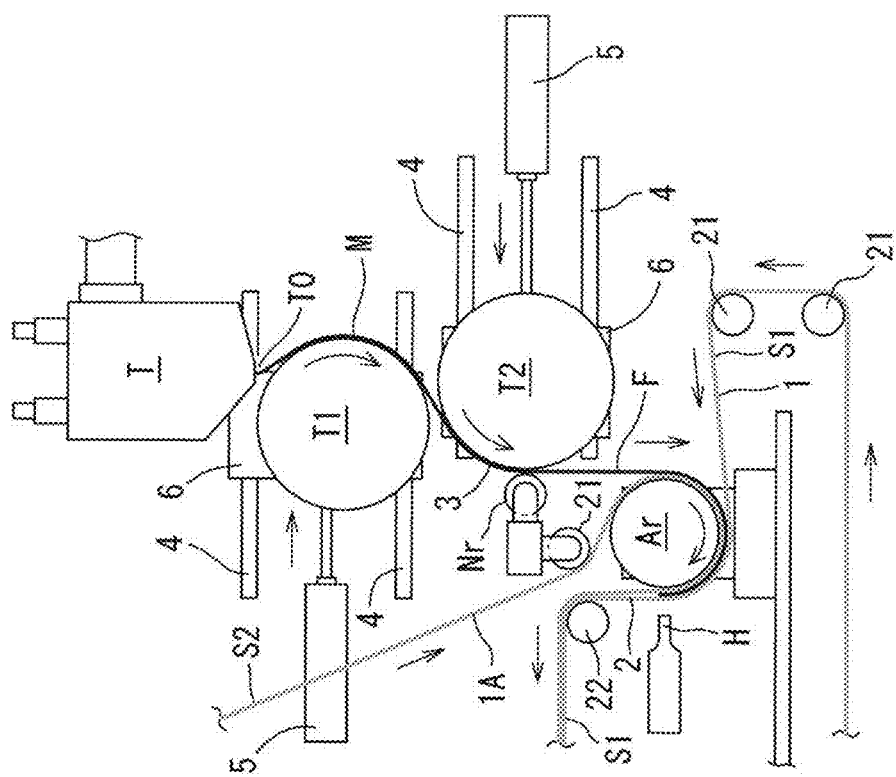

MANUFACTURING METHOD AND MANUFACTURING APPARATUS FOR LAMINATE

TECHNICAL FIELD

The present invention relates to a manufacturing method and a manufacturing apparatus for laminate usable in a part of a disposable absorbent article such as a disposable diaper and the like.

BACKGROUND ART

In recent years, a structure in which an elastomer film is sandwiched between a pair of nonwoven fabric sheets has been proposed as such a laminate. Further, it has been proposed to produce the film from resin in a molten state in a production line for this laminate (see patent literature 1).

CITATION LIST

Patent Literature

Patent Literature 1: JP H10-29259A (FIGS. 4 and 5)

SUMMARY OF INVENTION

In the above conventional technique, the resin in the molten state is extruded into a film from a discharge port, the elastomer film is produced by cooling a pre-elastomer having adhesiveness in the form of the extruded film and, thereafter, the elastomer film is laminated on the nonwoven fabric sheet.

In such a production line, when the production of laminates is temporarily stopped and, thereafter, the production is resumed, a pass line for the adhesive pre-elastomer film needs to be formed. However, conventionally, an operator has formed the pass line for the pre-elastomer by pulling a tip part of the adhesive pre-elastomer. Such operation is difficult in the case where the pre-elastomer is not completely solidified.

For example, when the elastomer film is produced and used as an elastic member in the production line for absorbent articles, the line is often stopped due to a change in the size of the products to be produced and the like, and the operation as described above is often performed.

The present invention aims to provide a manufacturing method and a manufacturing apparatus capable of easily forming a film pass line even after a production line, including a film manufacturing process, for laminate is stopped.

A manufacturing method of the present invention is a manufacturing method for manufacturing a laminate W by laminating a thermoplastic film F on a sheet S1 at a joining part (a joining area, a converging point) after a pass line forming process of forming a pass line for a film-formed film raw material M, the film raw material M becoming the thermoplastic film F, the pass line forming process including:

a hanging-down step of causing a resin in a molten state to hang down from a discharge port TO of a discharger T, the resin becoming the film raw material M, and the hanging-down step continuously discharging the film raw material M;

a first conveying step of conveying the sheet S1 in a lateral or oblique lateral direction along a sheet pass line 1 below the discharge port TO;

a receiving step of receiving a tip part E of the film raw material M with the sheet S1 on the sheet pass line 1, the tip part E being discharged and hanging down from the discharge port TO;

a second conveying step of conveying the sheet S1 and the film raw material M after the tip part E overlaps the sheet S1 on the sheet pass line 1, the second conveying step conveying the sheet S1 and the film raw material M in a mutually overlapping state along the sheet pass line 1; and an introducing step of introducing the sheet S1 and the film raw material M in the mutually overlapping state to the joining part from the sheet pass line 1.

On the other hand, a manufacturing apparatus of the present invention is a manufacturing apparatus for manufacturing a laminate W by laminating a thermoplastic film F on a sheet S1 at a joining part (a joining area, a converging point) after a pass line forming process of forming a pass line for a film-formed film raw material M, the film raw material M becoming the thermoplastic film F, the manufacturing apparatus comprising:

a discharger T for causing a resin in a molten state to hang down from a discharge port TO, the resin becoming the film raw material M, and the discharger T continuously discharging the film-formed film raw material M;

a sheet pass line 1 for conveying the sheet S1 in a lateral or oblique lateral direction below the discharge port TO, the sheet pass line 1 receiving a tip part E of the film raw material M with the sheet S1, the tip part E being discharged and hanging down from the discharge port TO, and the sheet pass line 1 conveying the sheet S1 and the film raw material M in a mutually overlapping state after the tip part E overlaps the sheet S1; and the joining part configured such that the sheet S1 and the film raw material M in the mutually overlapping state are introduced to the joining part from the sheet pass line 1.

In the present invention, the thermoplastic film F may be an elastomer film F and the film raw material M may be a film-formed (a film-like) pre-elastomer M.

In the present invention, the tip part E of the film-like pre-elastomer M hanging down from the discharge port is received by the sheet conveyed in the lateral or oblique lateral direction. Thus, the tip part E of the pre-elastomer M can be conveyed together with the sheet and introduced to the joining part for producing the laminate. Therefore, the film pass line can be easily formed.

In the present invention, the thermoplastic film may be a plastomer film having low stretchability. If the thermoplastic film is an elastomer film, the elastomer film may be a film having such high stretchability that a length is expanded by two to several folds and is restored to an initial length.

In the present invention, the resin in the molten state means resin discharged in the form of a film from a discharge port of a T die or the like at a temperature equal to or higher than a softening point of thermoplastic resin (e.g. thermoplastic elastomer).

The thermoplastic elastomer is a polymer material which is softened by heating and deformed by an external force, but exhibits rubber elasticity at a room temperature. The pre-elastomer M means a membrane-like (film-like) thermoplastic elastomer having properties close to those of a non-elastic liquid immediately after coming out in a molten state from a discharge port. For example, a polyethylene copolymer can be employed as the thermoplastic elastomer (see JP H10-29259A).

BRIEF DESCRIPTION OF THE DRAWINGS

FIGS. 2A and 2B are layout diagrams each showing one embodiment of a method for producing a film pass line, FIGS. 3A and 3B are layout diagrams each showing one embodiment of a manufacturing method and a manufacturing apparatus for laminate of the present invention.

DESCRIPTION OF EMBODIMENTS

Figure 1A:
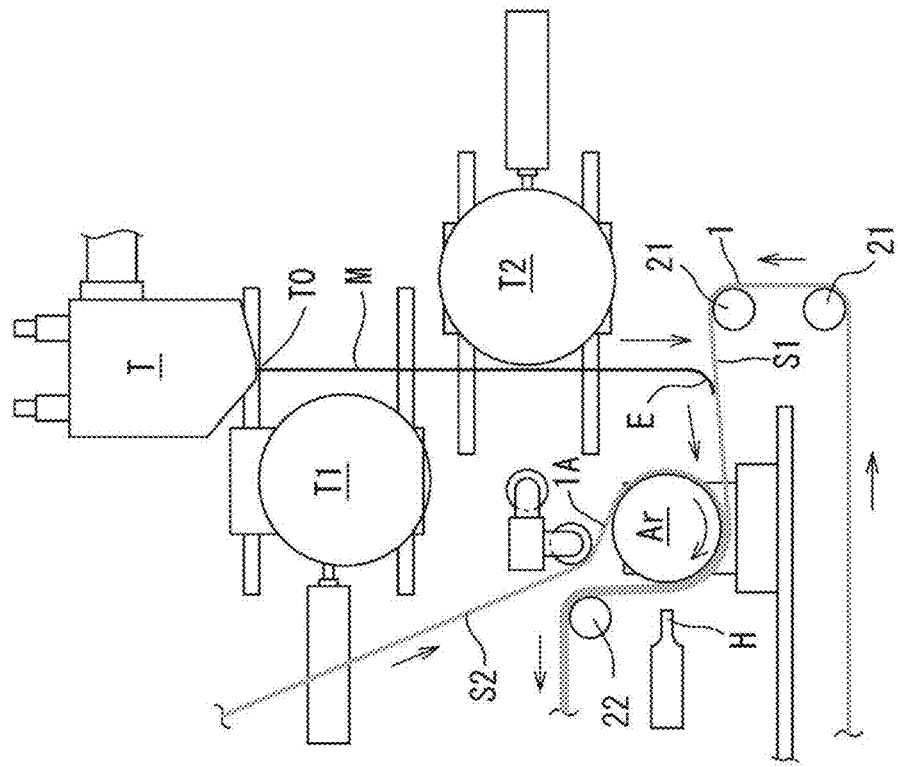
FIGS. 1A and 1B are layout diagrams each showing one embodiment of a method for producing a film pass line.

Preferably, the manufacturing method includes a bonding step of producing the laminate W by laminating the elastomer film F, obtained by solidifying the pre-elastomer M, by bonding it to the sheet S1 at the joining part after the pass line forming process.

In this case, the elastomer film F and the sheet S1 are bonded and laminated at the joining part in charge of the bonding step.

Preferably, the sheet S1 and the elastomer film F are conveyed in an overlapping manner along an outer peripheral surface of a bonding roll Ar serving as the joining part and the bonding step is performed on the bonding roll Ar.

In this case, the bonding step is performed on a bonding roll such as an anvil roll.

Preferably, the manufacturing method includes a first cooling step of cooling the film-formed pre-elastomer M hanging down from the discharge port TO by winding the pre-elastomer M on an outer peripheral surface of a first cooling roll T1 after the introducing step.

In this case, the film-formed pre-elastomer M is cooled by the first cooling roll to become a stretchable elastomer film.

Preferably, the first cooling roll T1 is provided movably to be able to contact and move away from the film-formed pre-elastomer M hanging down in the hanging-down step, and the first cooling step is started to cool the pre-elastomer M after the tip part E of the pre-elastomer M and the sheet S1 are wound on the bonding roll Ar.

In this case, the molten resin may not be adhered to the first cooling roll T1 in irregular pattern. Thus, the first cooling roll T1 may not prevent the film-formed pre-elastomer from being introduced into the sheet pass line 1.

Preferably, the first cooling roll T1 is arranged to face one side surface of the pre-elastomer M hanging down from the discharge port TO in the hanging-down step, a pressing roll is arranged to face another side surface opposite to the one side surface of the pre-elastomer M in the hanging-down step, and the manufacturing method further includes a step of moving the pressing roll in a direction intersecting a hanging direction of the pre-elastomer M to increase a contact distance of the pre-elastomer M with the first cooling roll T1.

In this case, cooling effect by the first cooling roll T1 enhances.

Preferably, the pressing roll is a second cooling roll T2, and the manufacturing method includes a second cooling step of further cooling the pre-elastomer M, which has been cooled by the first cooling roll T1, by the second cooling roll T2.

In this case, the film-formed pre-elastomer is further cooled by the second cooling roll T2.

Preferably, a nip roll Nr for sandwiching the elastomer film F is provided further upstream than the bonding roll Ar, and the manufacturing method includes a stretching step of stretching the elastomer film F before being bonded to the sheet S1 in a conveying direction by a conveying speed V of the elastomer film F on the bonding roll Ar larger than a conveying speed Vs of the elastomer film F on the nip roll Nr, the stretching step being performed after the first cooling step is started.

In this case, the elastomer film F is stretched in the conveying direction during conveyance before the lamination. After the lamination, the laminate W shrinks in the conveying direction in no-load state. This shrinkage fits the laminate W to a wearer's girth, etc.

Any feature illustrated and/or depicted in conjunction with one of the aforementioned aspects or the following embodiments may be used in the same or similar form in one or more of the other aspects or other embodiments, and/or may be used in combination with, or in place of, any feature of the other aspects or embodiments.

EMBODIMENT

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

Hereinafter, one embodiment of the present invention is described on the basis of the drawings. First, a steady manufacturing method and apparatus is described.

FIG. 3B shows a steady operation for continuously producing a laminate W. In FIG. 5, a discharger T is a known extrusion molding machine called a T-die, and a thermoplastic elastomer (resin) in a molten state is temporarily stored in the T die. The T die continuously produces pre-elastomer M by discharging the resin in the molten state, which becomes the pre-elastomer (an example of a film raw material) M, in the form of a film from a discharge port TO thereof.

The pre-elastomer M discharged from the discharge port TO is temporarily cooled by being wound on the outer peripheral surface of a first cooling roll T1, and conveyed toward the outer peripheral surface of a second cooling roll T2 below the first cooling roll T1. In this way, the pre-elastomer M is substantially solidified and has elasticity (stretchability) as an elastomer film (an example of the thermoplastic film) F.

The pre-elastomer M which moved toward the second cooling roll T2 is secondarily cooled by the outer peripheral surface of the second cooling roll T2. In this way, the pre-elastomer M is completely solidified to become the elastomer film (elastic film) F.

The secondarily cooled elastomer film F moves toward a bonding roll Ar after being sandwiched between the second cooling roll T2 and a nip roll Nr. The bonding roll Ar has a larger circumferential speed (conveying speed) than the second cooling roll T2. Thus, the elastomer film F is stretched in a conveying direction between the nip roll Nr and the bonding roll Ar.

As just described, the molten resin becomes the elastomer film (thermoplastic film) F by way of a state of the pre-elastomer (film raw material) M. Here, at which points of time a transition from the molten resin as a substance to the pre-elastomer M and a transition from the pre-elastomer M to the elastomer film F are exhibited differ depending on a glass-transition temperature, a thickness of the resin and a room temperature, and are not certain.

For example, the molten resin becomes the pre-elastomer M and looks like a solid substance at a glance immediately after coming out from the discharge port TO, but may have properties close to those of a non-elastic liquid.

On the other hand, the pre-elastomer M changes to the elastomer film F in a part pulled on a side downstream of the nip roll Nr, but this timing differs when the pre-elastomer M becomes the elastomer film F after contacting the second cooling roll T2 upstream of the nip roll Nr, when the pre-elastomer M becomes the elastomer film F after contacting the first cooling roll T1, and the like.

Accordingly, a film pass line 3 means this film conveyance path in a state where the film is at least partially the pre-elastomer (film raw material) M.

On the other hand, first and second sheets S1, S2 made of nonwoven fabric are supplied to the bonding roll Ar. The first and second sheets S1, S2 are supplied to the bonding roll Ar along a first sheet pass line 1 and a second sheet pass line 1A, respectively.

The elastomer film F is introduced to the bonding roll Ar while being sandwiched by the pair of sheets S1, S2, and the pair of sheets S1, S2 and the elastomer film F are bonded to and laminated with each other on the bonding roll Ar by an ultrasonic horn H to produce the laminate W.

Note that the laminate W may be produced not by ultrasonic bonding by the horn H, but by heat welding by a heating roll.

Although the laminate W is continuously produced, the production may be temporarily stopped due to a size change or the like. In this case, the film pass line shown in FIGS. 1A to 5A is formed for a new elastomer film F.

Next, the manufacturing apparatus is described.

Each cooling roll T1, T2 of FIG. 2B is rotatably supported on a corresponding slide base 6 and moved in a horizontal direction as shown in FIGS. 2B and 3A by a cylinder 5 along a guider 4. Each cooling roll T1, T2 is rotationally driven at a circumferential speed Vs by an unillustrated motor. On the other hand, the bonding roll Ar is rotationally driven at a circumferential speed V larger than the circumferential speed Vs by an unillustrated motor.

To form the film pass line 3 (FIG. 3B) anew, each cooling roll T1, T2 is first retracted by the cylinder 5 as shown in FIG. 1A. By this retraction, the pre-elastomer M newly discharged and hanging down from the discharge port TO of the discharger T does not contact each cooling roll T1, T2. Specifically, each cooling roll T1, T2 is provided movably to contact with and away from the hanging-down pre-elastomer M of FIG. 1A.

In FIG. 3A, each of the pass lines 1, 1A for the first and second sheets S1, S2 are formed by one or more first rolls 21, the bonding roll Ar, and the like for conveying the sheets S1, S2. A pass line 2 for the laminate W is formed by the bonding roll Ar, second rolls 22, and the like for conveying the laminate W. The film pass line 3 is formed by the first cooling roll T1 and the second cooling roll T2 for conveying the pre-elastomer M or elastomer film F and the bonding roll Ar and the like for bonding the elastomer film F to the both sheets S1, S2. The pass line 2 for the laminate W of FIG. 3B is formed so that the pair of sheet pass lines 1, 1A and the film pass line 3 join at the bonding roll Ar.

Next, a process of forming the film pass line 3 necessary prior to the production of a new laminate W of FIG. 3B is described.

As shown in FIG. 1A, in the film pass line forming process, the first cooling roll T1 is arranged to face one side surface of the pre-elastomer M hanging down from the discharge port TO. The second cooling roll T2 (pressing roll) is arranged to face the other side surface opposite to the one side surface. Thus, the pre-elastomer M discharged from the discharger T hangs straight down between the first cooling roll T1 and the second cooling roll T2 without contacting the first cooling roll T1 and the second cooling roll T2.

Specifically, the resin in the molten state, which becomes the pre-elastomer M of FIG. 1A, hangs down from the discharge port TO of the discharger T, and the film-like pre-elastomer M is continuously discharged. In this way, the pre-elastomer M hangs down on one flat plane along a vertical plane without contacting each roll T1, T2, Ar.

Figure 1B:
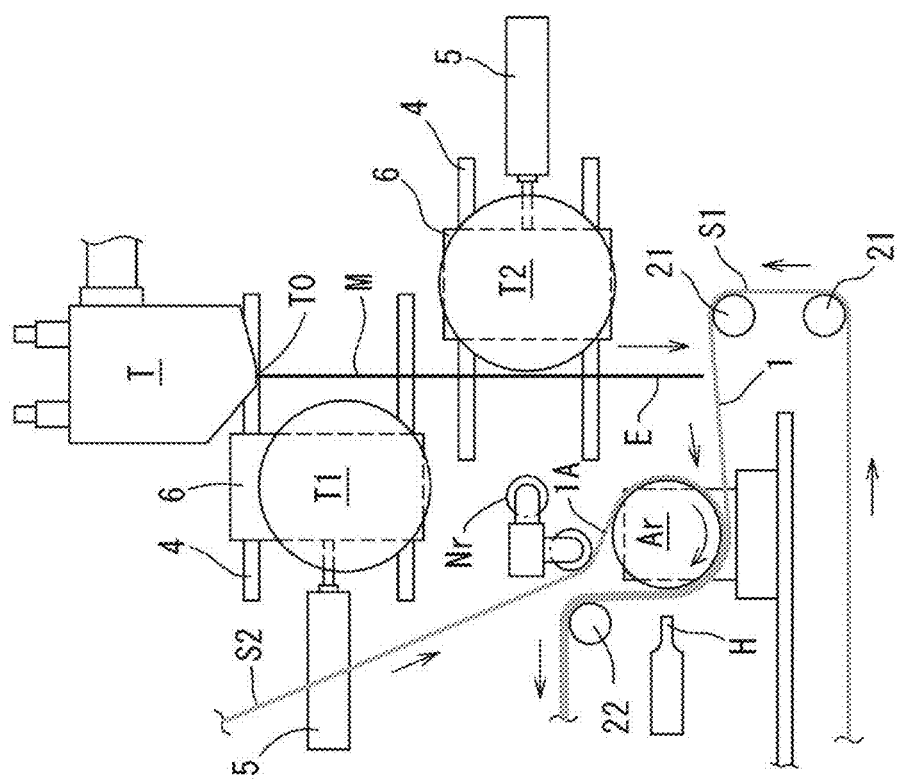

On the other hand, the first sheet S1 is conveyed along the first pass line 1 for first sheet in a lateral or oblique lateral direction immediately below the discharge port TO. In a state where the first sheet S1 is conveyed, the tip part E of the pre-elastomer M discharged and hanging down from the discharge port TO is received with the sheet S1 as shown in FIG. 1B.

After this receiving, the tip part E is overlapped on the first sheet S1 and the first sheet S1 and the pre-elastomer M in a mutually overlapping (doubled) state are conveyed along the first pass line 1 for first sheet as shown in FIG. 2A. The first sheet S1 and the pre-elastomer M in the mutually overlapping state are introduced along the outer peripheral surface of the bonding roll Ar (an example of a bonding part (joining part)) from the first pass line 1 for first sheet.

By this introduction, the pre-elastomer M starts to be linearly conveyed from the discharge port TO to contact the outer peripheral surface of the bonding roll Ar as shown in FIG. 2B. Thereafter, as shown in FIG. 3A, the first cooling roll T1 and the second cooling roll T2 are moved toward the pre-elastomer M.

In this way, the pre-elastomer M continuously discharged from the discharge port TO contacts the outer peripheral surfaces of the first cooling roll T1 and the second cooling roll T2, and the film pass line 3 in which the elastomer film F is sandwiched between the second cooling roll T2 and the nip roll Nr is formed (completed).

In the film pass line 3, a first cooling step is performed in which the pre-elastomer M is wound on the outer peripheral surface of the first cooling roll T1 to be cooled. If a manufacturing apparatus includes at least one cooling roll, a film pass line is formed when the pre-elastomer M contacts this cooling roll.

Further, as described above, the pressing roll, which is the second cooling roll T2, moves in a direction intersecting the hanging direction of the pre-elastomer M to increase a distance over which the pre-elastomer M contacts the first cooling roll T1. The pressing roll is the second cooling roll T2, and the pre-elastomer M cooled by the first cooling roll T1 is further cooled by the second cooling roll T2. In this way, the pre-elastomer is solidified to become the elastomer film F.

Note that each cooling roll is for cooling the molten resin or film and may internally include a flow passage for cooling a roll surface by the flow of a refrigerant.

On the other hand, the nip roll Nr sandwiches the elastomer film F on a side further upstream than the bonding roll Ar. After the film pass line 3 is formed, the elastomer film F before being bonded to the both sheets S1, S2 is stretched in the conveying direction because the conveying speed V of the elastomer film F on the bonding roll Ar is larger than the conveying speed Vs of the elastomer film F on the nip roll Nr. In this way, a pre-stress (tension) is applied to the elastomer film F.

After the process of forming the film pass line 3 of FIG. 3A, the horn H repeatedly applies ultrasonic vibration to the bonding roll Ar to bond the elastomer film F to the first and second sheets S1, S2 on the bonding roll Ar, whereby the laminate W is produced as shown in FIG. 3B. Specifically, the both sheets S1, S2 and the elastomer film F are conveyed in an overlapping manner along the outer peripheral surface of the bonding roll Ar and the horn H applies ultrasonic vibration to the bonding roll Ar, whereby ultrasonic energy is applied to the both sheets S1, S2 and the elastic film F, and the nonwoven fabric sheets and the elastomer film are bonded and laminated.

Note that the bonding may be, for example, intermittently performed so that the laminate W alternately has stretch regions and bonded regions.

The pre-elastomer M discharged from the discharge port T0 of FIG. 1A has uneven quality in the initial production stage. Thus, the initially formed pre-elastomer M may be cut and removed, and then be discarded.

Although the preferred embodiment has been described above with reference to the drawings, a person skilled in the art would easily arrive at various changes and modifications within an obvious range through this specification.

For example, one cooling roll may be provided. Further, the pre-elastomer may be cooled by air without providing any cooling roll.

Therefore, such changes and modifications are interpreted to be within the scope of the present invention determined from claims.

INDUSTRIAL APPLICABILITY

The present invention can be utilized in the manufacturing of a laminate for a wearable article such as a disposable diaper.

LIST OF REFERENCE SIGNS

1: first sheet pass line,
1A: second sheet pass line
2: laminate pass line,
3: film pass line
4: guider,
5: cylinder,
6: slide base
21: first roll,
22: second roll
F: elastomer film (example of thermoplastic film)
M pre-elastomer (example of film raw material),
M1: initially formed part
S1: first sheet,
S2: second sheet,
W: laminate
E: tip part
Ar: bonding roll,
H: horn,
Nr: nip roll
P1: retracted position,
P2: contact position
T: discharger,
T0: discharge port
T1: first cooling roll,
T2: second cooling roll

The invention claimed is:

1. A manufacturing apparatus for manufacturing a laminate by laminating a thermoplastic film on a sheet at a joining part after a pass line forming process of forming a pass line for a film-formed film raw material, the film raw material becoming the thermoplastic film upon cooling the film raw material, the manufacturing apparatus comprising:
  a discharger for causing a resin in a molten state to hang down from a discharge port, the resin becoming the film raw material, and the discharger continuously discharging the film raw material;
  a sheet pass line for conveying the sheet in a lateral or oblique lateral direction below the discharge port, the sheet pass line receiving a tip part of the film raw material with the sheet, the tip part being discharged and hanging down from the discharge port, and the sheet pass line conveying the sheet and the film raw material in a mutually overlapping state after the tip part overlaps the sheet;
  the joining part configured such that the sheet and the film raw material in the mutually overlapping state are introduced to the joining part from the sheet pass line; and
  a first cooling roll configured to cool the film raw material, causing the film raw material to become the thermoplastic film, after the sheet and the film raw material in the mutually overlapping state are introduced to the joining part from the sheet pass line, the film raw material hanging down from the discharge port and being wound on an outer peripheral surface of the first cooling roll;
  wherein the thermoplastic film is an elastomer film and the film raw material is a film-formed pre-elastomer.

2. The manufacturing apparatus according to claim 1, wherein the laminate is produced at the joining part by laminating the thermoplastic film, obtained by solidifying the film raw material, to the sheet and bonding the thermoplastic film to the sheet.

3. The manufacturing apparatus according to claim 2, wherein a bonding roll constitutes at least a part of the joining part, the bonding roll being configured such that the sheet and the thermoplastic film are conveyed in an overlapping manner along an outer peripheral surface of the bonding roll.

4. The manufacturing apparatus according to claim 1, wherein the first cooling roll is provided movably and is capable of contacting and moving away from the film raw material hanging down from the discharge port.

5. The manufacturing apparatus according to claim 4, wherein:
  the first cooling roll is arranged to face one side surface of the film raw material hanging down from the discharge port, and
  the manufacturing apparatus further includes a pressing roll arranged to face another side surface opposite to the one side surface of the film raw material and configured to move in a direction intersecting a hanging direction of the film raw material to increase a contact distance of the film raw material with the first cooling roll.

6. The manufacturing apparatus according to claim 5, wherein the pressing roll is a second cooling roll for further cooling the film raw material having been cooled by the first cooling roll.

7. The manufacturing apparatus according to claim 6, wherein:
  a nip roll for sandwiching the thermoplastic film is provided further upstream than the bonding roll, and
  a conveying speed of the thermoplastic film on the bonding roll is set to be larger than a conveying speed of the thermoplastic film on the nip roll after the first cooling step is started so that the thermoplastic film before being bonded to the sheet is stretched in a conveying direction.

8. A manufacturing method for manufacturing the laminate using the manufacturing apparatus of claim 1 by laminating the thermoplastic film on the sheet at the joining part after the pass line forming process of forming the pass line for the film-formed film raw material, the film raw material becoming the thermoplastic film upon cooling the film raw material, the pass line forming process comprising:
  a hanging-down step of causing the resin in the molten state to hang down from the discharge port of the discharger, the resin becoming the film raw material, and the hanging-down step continuously discharging the film raw material;
  a first conveying step of conveying the sheet in the lateral or oblique lateral direction along the sheet pass line below the discharge port;
  a receiving step of receiving the tip part of the film raw material with the sheet on the sheet pass line, the tip part being discharged and hanging down from the discharge port;
  a second conveying step of conveying the sheet and the film raw material after the tip part overlaps the sheet on the sheet pass line, the second conveying step conveying the sheet and the film raw material in the mutually overlapping state along the sheet pass line;
  an introducing step of introducing the sheet and the film raw material in the mutually overlapping state to the joining part from the sheet pass line; and
  a first cooling step of cooling the film raw material hanging down from the discharge ort by winding the film raw material on an outer peripheral surface of the first cooling roll at an upstream of the joining part after the introducing step;
  wherein the thermoplastic film is an elastomer film and the film raw material is a film-formed pre-elastomer.

9. The manufacturing method according to claim 8, comprising a bonding step of bonding the thermoplastic film, obtained by solidifying the film raw material, to the sheet and laminating each other at the joining part to produce the laminate.

10. The manufacturing method according to claim 9, wherein the sheet and the thermoplastic film are conveyed in an overlapping manner along an outer peripheral surface of a bonding roll serving as the joining part and the bonding step is performed on the bonding roll.

11. The manufacturing method according to claim 8, wherein:
  the first cooling roll is provided movably and is capable of contacting and moving away from the film raw material hanging down in the hanging-down step, and
  the first cooling step is started to cool the film raw material after the tip part of the film raw material and the sheet are wound on the bonding roll.

12. The manufacturing method according to claim 11, wherein:
  the first cooling roll is arranged to face one side surface of the film raw material hanging down from the discharge port in the hanging-down step,
  a pressing roll is arranged to face another side surface opposite to the one side surface of the film raw material in the hanging-down step, and
  the manufacturing method further includes a step of moving the pressing roll in a direction intersecting a hanging direction of the film raw material to increase a contact distance of the film raw material with the first cooling roll.

13. The manufacturing method according to claim 12, wherein:
  the pressing roll is a second cooling roll, and
  the manufacturing method includes a second cooling step of further cooling the film raw material, which has been cooled by the first cooling roll, by the second cooling roll.

14. The manufacturing method according to claim 13, wherein:
  a nip roll for sandwiching the thermoplastic film is provided further upstream than the bonding roll, and
  the manufacturing method includes a stretching step of stretching the thermoplastic film before being bonded to the sheet in a conveying direction by a conveying speed of the thermoplastic film on the bonding roll larger than a conveying speed of the thermoplastic film on the nip roll, the stretching step being performed after the first cooling step is started.

* * * * *